US012591477B2

(12) United States Patent  
Shao et al.

(10) Patent No.: US 12,591,477 B2  
(45) Date of Patent: Mar. 31, 2026

(54) SERVICE MANAGEMENT USING DYNAMICALLY CALCULATED REQUESTS PER SECOND THRESHOLDS

(71) Applicant: Intuit Inc., Mountain View, CA (US)

(72) Inventors: Xiaotang Shao, Cupertino, CA (US); Estela Ramirez, Mountain View, CA (US); Hui Luo, Fremont, CA (US); Shreyas Badiger Mahadev, Santa Clara, CA (US); Todd Edward Ekenstam, Thousand Oaks, CA (US); Venkata Sukumar Reddy Gunapati, Mountain View, CA (US); Zihan Jiang, Foster City, CA (US); Sushanth Kamath Ammembal, Bangalore (IN); Sen Lin, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/759,740

(22) Filed: Jun. 28, 2024

(65) Prior Publication Data

US 2026/0003707 A1 Jan. 1, 2026

(51) Int. Cl.
 G06F 11/07 (2006.01)

(52) U.S. Cl.
 CPC ........ G06F 11/076 (2013.01); G06F 11/0709 (2013.01)

(58) Field of Classification Search
 CPC ........................... G06F 11/076; G06F 11/0709
 See application file for complete search history.

(56) References Cited

U.S. PATENT DOCUMENTS

| | | | |
|---|---|---|---|
| 8,417,811 B1 * | 4/2013 | Jenkins | G06F 11/3442 709/224 |
| 2003/0079160 A1 * | 4/2003 | McGee | G06F 17/18 714/39 |

(Continued)

FOREIGN PATENT DOCUMENTS

| | | | |
|---|---|---|---|
| KR | 102367409 B1 * | 2/2022 | G06F 11/2263 |

OTHER PUBLICATIONS

Scalability, Wikipedia, the free Encyclopedia, Jun. 26, 2024. Retrieved from the Internet: <URL:https://en.wikipedia.org/w/index.php?title=Scalability&oldid=1231063246> (Year: 2024).*

(Continued)

*Primary Examiner* — Ashish Thomas
*Assistant Examiner* — Bryan P Huang
(74) *Attorney, Agent, or Firm* — Lathrop GPM LLP

(57) ABSTRACT

Service management using dynamically calculated requests per second (RPS) thresholds include monitoring, over a span of time and across services instances of a service, a resource usage of a hardware resource and a requests per second (RPS) by the service instances obtain service instance data points that include resource usage metrics related to RPS numbers, and performing a regression of the service instance data points to obtain a current set of correlation functions between the resource usage and the RPS, and selecting a RPS threshold using the current set of correlation functions and a current amount of the hardware resource assigned to the service. Service management further includes continually monitoring the RPS for the service to detect when the RPS satisfies the RPS threshold and managing the service responsive to the RPS satisfying the RPS threshold.

18 Claims, 4 Drawing Sheets

(56) References Cited

U.S. PATENT DOCUMENTS

| | | | | |
|---|---|---|---|---|
| 2005/0005012 A1* | 1/2005 | Odhner | ................. | G06Q 10/06 |
| | | | | 709/226 |
| 2010/0218005 A1* | 8/2010 | Jain | ...................... | G06F 9/5094 |
| | | | | 713/300 |
| 2018/0373580 A1* | 12/2018 | Ertl | ................... | G06F 11/3433 |
| 2022/0027249 A1* | 1/2022 | Dua | ................... | G06F 11/3466 |
| 2023/0153223 A1* | 5/2023 | Sankaranarayanan | ...................... | |
| | | | | G06F 11/3006 |
| | | | | 714/48 |

OTHER PUBLICATIONS

Busser, S., "Adopt Recommendations and Monitor Predictive Scaling for Optimal Compute Capacity", Jan. 25, 2023, 6 pages.
Kapelonis, K., "Rate Limiting on Kubernetes Applications with Traefik Proxy and Codefresh", Oct. 18, 2021, 19 pages.
"Enabling Rate Limits" Istioldie 1.4, https://istio.io/v1.4/docs/tasks/policy-enforcement/rate-limiting/, Jan. 1, 2019, 6 pages.
"Setting Rate Limits for Specific Kubernetes Pod Traffic" https://www.pulumi.com/ai/answers/r4pTD9y4M9jMMeKJjgDoGD/enforcing-traffic-control-with-kubernetes-and-istio, Jan. 30, 2024, 2 pages.
Zhou, Z., et al., "AHPA: Adaptive Horizontal Pod Autoscaling Systems on Alibaba Cloud Container Service for Kubernetes", The Thirty-Seventh AAAI Conference on Artificial Intelligence, Jan. 1, 2023, 9 pages.

* cited by examiner

Graph 300

SERVICE MANAGEMENT USING DYNAMICALLY CALCULATED REQUESTS PER SECOND THRESHOLDS

BACKGROUND

In a client server model, client computing devices sends a request to a server computing device that processes the requests. In large enterprise environments, thousands of client computing devices may be concurrently sending requests to the server computing device. Further, the server computing device may have thousands of services that processes the requests. For example, the services may be microservices. A single request may trigger multiple microservices performing various processing. To respond to all of the requests, a single service may have thousands of service instances, or instances of a service that each independently process the request. Each service instance may be allocated hardware resources (e.g., processing time, memory, etc.) on the server computing device. Thus, aspect of managing the hardware resources of the server computing device is effectively managing the service instances that are active to process requests.

SUMMARY

In general, in one aspect, one or more embodiments relate to a method that includes monitoring, over a span of time and across services instances of a service, a resource usage of a hardware resource and a requests per second (RPS) by the service instances obtain service instance data points that include resource usage metrics related to RPS numbers, and performing a regression of the service instance data points to obtain a current set of correlation functions between the resource usage and the RPS, and selecting a RPS threshold using the current set of correlation functions and a current amount of the hardware resource assigned to the service. The method further includes continually monitoring the RPS for the service to detect when the RPS satisfies the RPS threshold and managing the service responsive to the RPS satisfying the RPS threshold.

In general, in one aspect, one or more embodiments relate to a server computing device that includes hardware resources, service instances of a service executing on the hardware resources, a resource usage tracker, and a service manager. A resource usage tracker executes on the server computing device. The resource usage tracker is configured to perform first operations that include obtaining, for over a first span of time and across the services instances of the first service, a first resource usage of a hardware resource and RPS by the service instances to obtain service instance data points including the resource usage metrics related to a RPS numbers, performing a regression of the service instance data points to obtain a current set of correlation functions between the resource usage and the RPS, and selecting an RPS threshold using the current set of correlation functions and a current amount of the hardware resource assigned to the service. The service manager executing on the server computing device and configured to perform second operations that include continually monitoring the RPS for the service to detect when the RPS satisfies the RPS threshold and managing the service responsive to the RPS satisfying the RPS threshold.

In general, in one aspect, one or more embodiments relate to a non-transitory computer readable medium including computer readable program code for causing a computing device to perform operations. The operations include monitoring, over a span of time and across services instances of a service, a resource usage of a hardware resource and a requests per second (RPS) by the service instances obtain service instance data points that include resource usage metrics related to RPS numbers, and performing a regression of the service instance data points to obtain a current set of correlation functions between the resource usage and the RPS, and selecting a RPS threshold using the current set of correlation functions and a current amount of the hardware resource assigned to the service. The operations further include continually monitoring the RPS for the service to detect when the RPS satisfies the RPS threshold and managing the service responsive to the RPS satisfying the RPS threshold.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to managing server computing device by managing the services executing on the server computing device. Rather than determining target hardware usage directly, one or more embodiments correlate the hardware resource usage to requests per second (RPS). Specifically, the correlation relates various RPS values to percentages of the hardware resource usage being performed by a service. By determining a correlation, for a current amount of the hardware resource allocated to the service, a threshold RPS value may be determined for managing the service and the service instances of the service. For example, the threshold RPS value may be used to define when to add or remove service instances, perform rate throttling, or perform other actions. By using the RPS threshold that is correlated to hardware resource usage, one or more embodiments provide a technique to manage the usage of the hardware resources and the service by monitoring RPS values.

Figure 1:
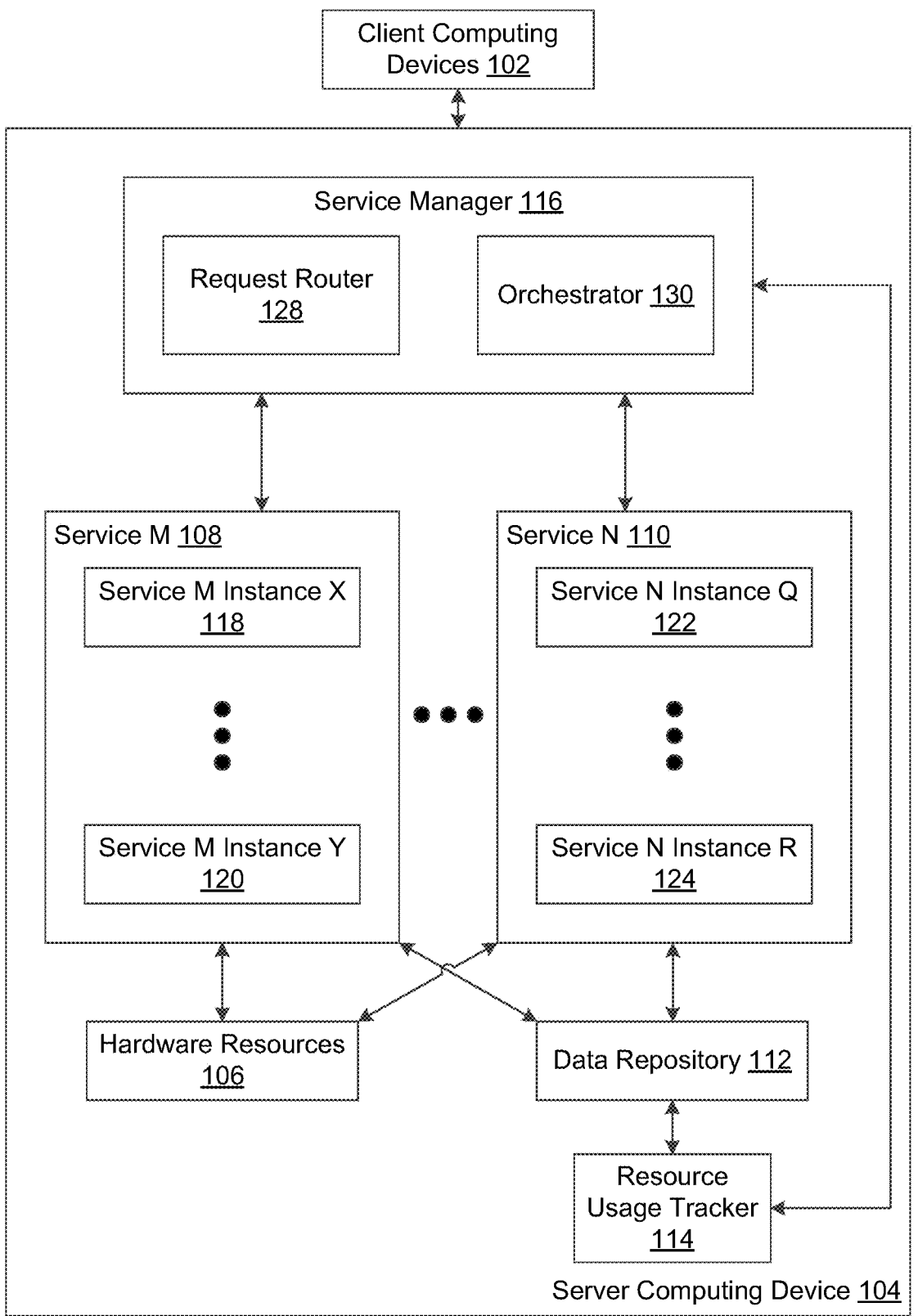
FIG. 1 shows a diagram of a system in accordance with one or more embodiments of the invention.

Turning to the figures, FIG. 1 shows a diagram of a system in accordance with one or more embodiments. As shown in FIG. 1, the system includes a client computing devices (102) connected to a server computing device (104). The client computing devices (102) and the server computing device (104) may correspond to the computing device discussed in reference to FIG. 4A and FIG. 4B. Specifically, as described in FIG. 4A and FIG. 4B, a computing device may include multiple nodes or physically separate computers. For example, the server computing device (104) may be a cluster computing system, a server farm, a distributed computing system, or other computing system. The client computing devices (102) may be one or more user computing devices or other computing devices that send requests and receive responses from the server computing device. Multiple independent client computing devices may be in communication with the server computing device.

The server computing device (104) includes hardware resources (106), services (e.g., service M (108), service N (110)) that execute on the hardware resources (106), a data repository (112), a resource usage tracker (114), and a service manager (116). Each of these components is described below.

The hardware resources (106) are the physical resources of the server computing device (104). For example, the hardware resources (106) may include processors, memory, threads, heap memory, storage, network bandwidth, and other physical resources of the server computing device.

The hardware resources (106) are allocated to services. The allocation may be through a virtual machine or container that executes the services. Thus, the allocation may be direct or indirect to the services. The term, service, corresponds to a standard definition used in the art of computer science. A service is software that receives and processes requests to generate a response to the request. Multiple different services may exist. Each service may have one or more service instances. For example, service M (108) has service M instance X (118) through service M instance Y (120) and service N has service N instance Q (122) through service N instance R (124) that execute on the hardware resource (106). The different service instances are different instantiations of the services. Thus, each service instance is a copy of the service that is configured to perform the functionality of the service. By having multiple service instances, multiple requests may be concurrently processed. Although not shown in FIG. 1, service instances may operate in a container and/or a virtual machine. For the purposes of the description, resource usage metrics (described below) by a service instance may be metrics from a particular service instance or container or virtual machine level metrics.

The services (e.g., service M (108), service N (110)) are connected to a data repository (112) for managing the services. Specifically, the service instances of the service are connected to the data repository (112). The connection may be direct, such as shown in FIG. 1 or indirect, such as through the service manager (116) or other component that logs information about the processing by the services.

In one or more embodiments of the invention, the data repository (112) is any type of storage unit and/or device (e.g., a file system, database, data structure, or any other storage mechanism) for storing data. Further, the data repository (112) may include multiple different, potentially heterogeneous, storage units and/or devices. The data repository (112) includes functionality to store log files and service instance data points. A log file is a log of events that occur on the server computing device (104). Multiple log files may be generated. For example, each service or service instance may have one or more log files. Further, a service manager (116) may have one or more log files. One or more logging processes (not shown) may be configured to store records of the events to the log file.

A service instance data point is a record for a particular service instance and for a particular time unit. A time unit is a discrete length of time in which the set of requests is aggregated to form a service instance data point. Namely, a service instance data point has a recordation of the service instance processing the requests over the time unit. The service instance data point may store one or more of a service identifier, a service instance identifier, a request type, data filtering metrics, a request per second value, and resource usage metrics for the time unit.

The request type may be the type of request from the client device service. For example, the request type may be a get request and a post request.

The data filtering metrics are metrics that may be used to determine whether to filter the service instance data point. The data filtering metrics may include a ready status of the service instance being able to process the request (e.g., whether the service instance is ready to process requests), request error metric (e.g., number of requests that resulted in an error response), request latency metric (e.g., the amount of latency in responding to the requests).

The RPS value is the number of RPS processed by the service instance that is aggregated across the time unit. For example, if the time unit is five minutes, the RPS value may be the RPS averaged across a current five minutes. Other aggregation may be used to generate the RPS value besides averaging without departing from the scope of the claims.

The resource usage metrics are metrics recording the usage of the hardware resources (106) for the particular service instance and time unit. For example, the resource usage metrics may include one or more of container level metrics, CPU usage metrics (e.g., amount of CPU time processing for the service instance, percentage of CPU time allocated to the service instance that is being used processing a request), memory usage metrics (e.g., amount or percentage of memory in use), JAVA virtual machine (JVM) heap metric (e.g., a current heap size), busy thread metric (e.g., how often the thread is actively processing), and thread count (e.g., a number of threads assigned to the service).

The resource usage tracker (114) is configured to obtain service instance data points from the data repository (112) and determine a correlation between the resource usage of one or more hardware resource(s) (106) with the RPS processed by the service. In particular, each service instance data point is a single independent data point for a particular service instance. The resource usage tracker is configured to aggregate the service instance data points across the service instances to determine how resource usage metrics relates to the RPS for a particular service. The resource usage tracker (114) may be configured to generate a set of correlation functions for the service.

A correlation function is a function that relates the resource usage to RPS. In one or more embodiments, the correlation function is a continuous mathematical function. The set of correlation functions may have one correlation function or more than one correlation function. If multiple correlation functions are used, then the multiple correlation functions may correspond to different quantiles of service instance data points. A set of correlation functions is defined as current when the service manager (116) may currently use the set of correlation functions. For example, the current set of correlation functions may be a most recent determined correlation between resource usage metrics and the RPS. The set of correlation functions may be iteratively updated using the technique described in FIG. 2.

Continuing with FIG. 1, the service manager (116) is software configured to manage the operations of a service. A single service manager (116) may exist for multiple different services, or an individual service manager (116) may exist for each service. Further, multiple instances of the service manager (116) may exist. In one or more embodiments, service manager (116) is further configured to track and monitor the RPS for the service and service instances and manage the service accordingly. The service manager (116) may include a request router (128) and an orchestrator (130). The request router (128) is configured to route requests from the client computing devices to services and particular service instances. The request router (128) may further be configured to throttle or drop requests based on current RPS value of the service. The orchestrator (130) is configured to add new service instances to the service. The orchestrator (130) may further be configured to disable service instances. The service manager may be configured to perform other service management operations without departing from the scope of the claims.

While FIG. 1 shows a configuration of components, other configurations may be used without departing from the scope of the invention. For example, various components may be combined to create a single component. As another example, the functionality performed by a single component may be performed by two or more components.

Figure 2:
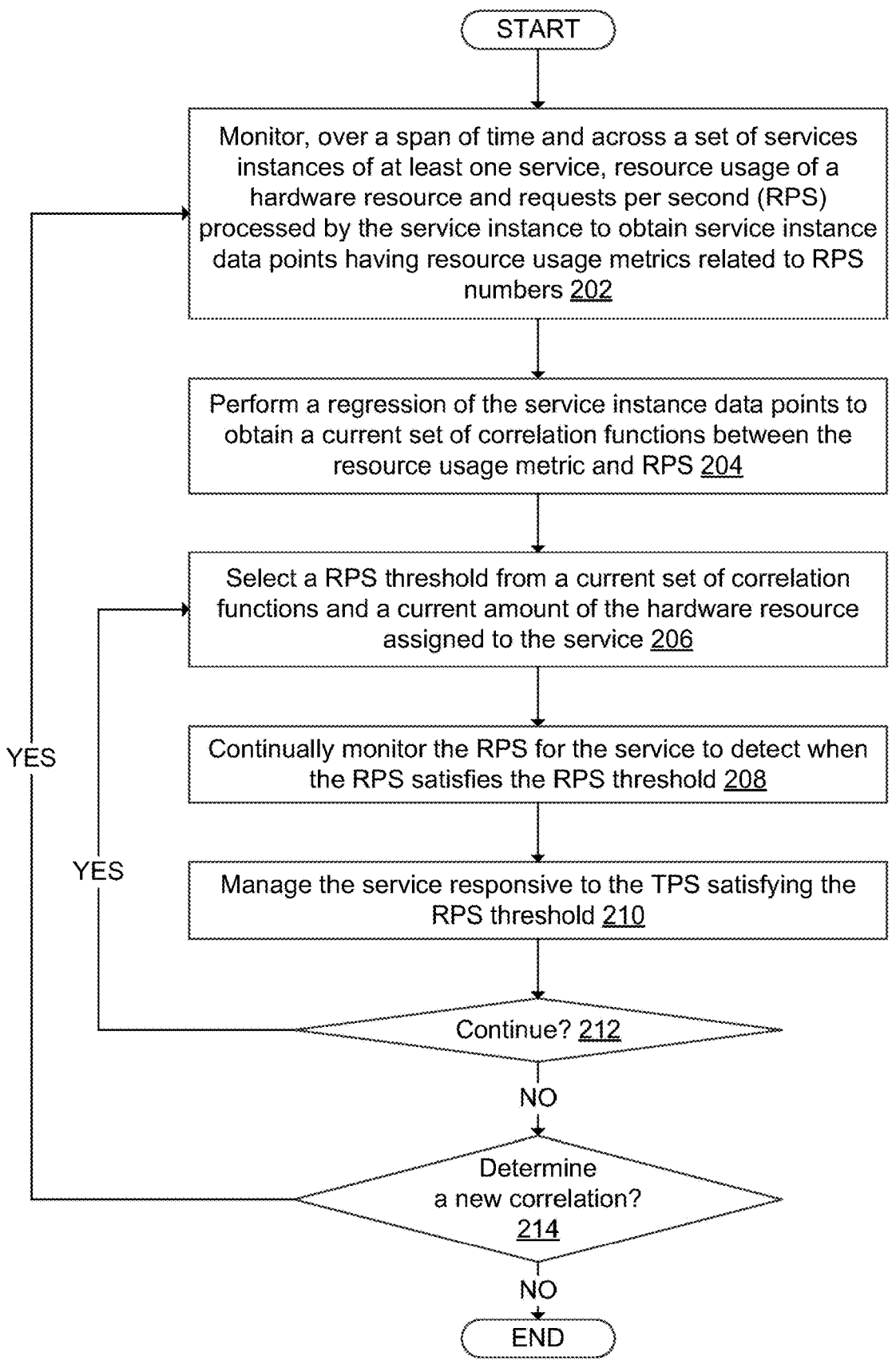
FIG. 2 shows a flowchart in accordance with one or more embodiments.

FIG. 2 shows a flowchart in accordance with one or more embodiments. While the various steps in this flowchart are presented and described sequentially, at least some of the steps may be executed in different orders, may be combined, or omitted, and at least some of the steps may be executed in parallel. Furthermore, the steps may be performed actively or passively.

In Block 202, over a span of time and across a set of services instances of a service, a resource usage of a hardware resource and a requests per second (RPS) by the service instances is monitored to obtain service instance data points that include resource usage metrics related to RPS numbers. In one or more embodiments, the monitoring is continually performed using a sliding window over a set of time units. Over a sliding window span of time multiple service instance data points are acquired for a service instance.

The monitoring may proceed as follows. As service requests are received for a service, the service requests are routed to a service instances. The service instances process the requests. A backend process associated with the service instance may log information about the service instance processing the request. For example, a backend process associated with the routing may log information about which requests are transmitted to which services. As another example, a backend process may log the number of requests that are transmitted or processed by the service within a predefined time unit. Further, a backend process may log the resource usage metrics identifying hardware resources that are used by the service instance to process the request.

Service instance data points may be gathered from the various logs. Further, a single service instance data point may be aggregated from multiple logs. The resource usage metrics may also be partitioned on a per service basis. To perform the partitioning, the service instance data points having a service identifier that are different are placed in separate subsets of service instance data points. Thus, the set of services instances that are associated with a particular service may be processed separately from other services instances of other services. Thereby, each set of service instances associated with a same service may have independent request per second threshold than other service instances of the other services.

Further partitioning of the service instance data point may be performed based on request type. For example, in a similar manner to partitioning based on service, service instance data points may be further partitioned into different subsets based on a request type identifier in the service instance data points. By way of a more detailed example, get requests may be processed separately from post requests. The individual partitioning results in performing a corresponding regression and selecting a corresponding RPS threshold using the corresponding regression for the independently for each partition as explained below. Thus, each request type may be individually managed.

Various metrics in the service instance data points may be used to perform the filtering. For example, the metrics for data filtering may include pod ready status metric, request error metric, request latency metric. The data filtering removes outliers from the service instance data points.

In some cases, the outliers remove all service instance data points for a particular service instance. For example, the outliers that may be filtered are a subset of the service instance data points that correspond to a service instance having less than a threshold amount of operating time. In one or more embodiments, the threshold is determined by averaging a warmup time across the service instances of the service. The warmup time for each service instance is determined by gathering resource usage metrics immediately after a service instance is instantiated and determining the amount of time before the resource usage metrics indicates a leveling of resource usage. The amount of time before the resource usage metrics indicates the leveling of resource usage is the warmup time. Averaging the warmup time across the service instances may be the threshold amount of operating time for the particular service instance. Thus, service instance data points for service instances having less than the threshold amount of the operating time are removed.

Further filtering may be performed to remove outliers in terms of the defects in the service instance processing requests. For example, service instance data points reflecting when a corresponding service instance has greater than a threshold number of defects may be filtered. Independently for the particular service, the threshold amount may be a dynamic calculated based on the service instance data points of the particular service.

For example, with respect to latency, the threshold amount of latency may be calculated by dynamically determining the distribution of latency across the service instance data points. From the distribution, the latency amount that corresponds to a threshold quantile is selected as the threshold latency. Service instance data points having more than the threshold latency are filtered from further processing, while remaining service instance data points remain for further processing. The higher latency may be indicative that the particular service instance has a defect in processing requests or is not indicative of standard processing by the service instance.

A similar operation may be performed for request errors. Specifically, the threshold amount of request errors may be calculated by dynamically determining the distribution of request errors across the service instance data points. From the distribution, the request errors amount that corresponds to a threshold quantile is selected as the threshold request errors. Service instance data points having more than the threshold request errors are filtered from further processing, while remaining service instance data points remain for further processing.

In Block 204, a regression of the service instance data points is performed to obtain a current set of correlation functions between the resource usage metric and RPS. In one or more embodiments, a quantile regression algorithm is used with the quantile being one or more set values to create a current set of correlation functions. Each correlation function in the current set of correlation functions corresponds to a line relating the RPS to a resource usage metric.

The current set of correlation functions may have one correlation function or more than one correlation function. If more than one correlation function is in the set of correlation functions, the various correlation functions in the set corresponds to various correlation levels. A correlation level is a quantile. Thus, each correlation function in the set corresponds to a different quantile. The quantile regressions may be generated by quantiles such as 80%, 50% and 20%. Other percentages of quantile regressions may be used. Thus, each correlation level corresponds to a different relationship between the resource usage and the RPS. For example, at the 80% quantile, 80% of the service instance data points may have less hardware resource usage than defined by the line of the correlation function for the same number of requests as defined by the line. For example, at the 20% quantile, 80% of the service instance data points may have greater hardware resource usage than defined by the line of the correlation function for the same number of requests as defined by the line, and 20% may have less hardware resource usage. At the 50% level, the number of service instance data points above and below the line are the same.

In Block 208, an RPS threshold is selected from a current set of correlation functions and a current amount of the hardware resource assigned to the service. Using the current amount of hardware resource and selecting a correlation function from the set of correlation functions, a lookup is performed to obtain the RPS threshold. The RPS threshold may be a value that is directly correlated by the correlation function to the current amount of hardware resource assigned to the service. As another example, the RPS threshold may be determined by calculating a predefined percentage of the hardware resource currently assigned to the service and using the predefined percentage as an input value to the correlation function to obtain the corresponding RPS. The corresponding RPS is then used as the RPS threshold. As another example, the RPS threshold may be determined by determining the RPS value that is correlated by the correlation function the current hardware resources assigned to the service and using a percentage of the RPS value as the RPS threshold. If the current set of correlation functions includes multiple correlation functions, multiple RPS thresholds may be determined (e.g., one from each function). The multiple correlation functions may be used to determine individual RPS thresholds. Each individual RPS threshold may be used to perform different managements of the service.

In Block 208, the RPS for the service is continually monitored to detect when the RPS satisfies the TPS threshold. The service manager may receive and route requests to different service instances. As the service manager is processing requests, the service manager tracks the RPS value. When the RPS value for a time unit satisfies one or more of the RPS thresholds, the service manager may trigger an alert that causes a different portion of the service manager to perform an action.

In Block 210, the service is managed responsive to the TPS satisfying the TPS threshold. Managing the service may include performing request rate limiting of the service, instantiating new service instances to create new instances of a service, disabling service instances, adding hardware resources, removing hardware resources, or performing other actions. Because the RPS threshold may be determined on a per service basis, the management is on a per service basis. Further, when the RPS threshold is performed on a per request type basis, the management may also be performed on a per request type basis. For example, rate throttling may be performed for get requests, but not for post requests. As another example, various levels of rate throttling may be performed for the different request types.

In Block 212, a determination is made whether to continue with the current correlation. If the determination is made to continue, the flow continues with Block 206 to select a new RPS threshold. The management of the services may allocate new or additional hardware resources to one or more service instances. Accordingly, new RPS thresholds may be selected may be selected in Block 208. Alternatively, although not shown in FIG. 2, the continual monitoring may be performed with the current RPS thresholds. In such a scenario, the flow may proceed with Block 208.

If the determination is made not to continue, a determination may be made whether to proceed with a new correlation. If a determination is made to proceed with a new correlation, the flow proceeds with Block 202 to monitor the resource usage to determine a new correlation. As another example, the processing of Blocks 202, 204, and 206 may be performed independently of the monitoring and managing of the service. For example, Block 202, Block 204, and Block 206 may be performed as a background process to iteratively update the RPS threshold. If a new set of correlation functions is determined, the new set of correlation functions replaces the current set of correlation functions and becomes the current set of correlation functions. Similarly, if a new RPS threshold is determined, the new RPS threshold replaces the current RPS threshold and becomes the current RPS threshold to manage the service. Thus, the monitoring reflects the current hardware resource usage of the service responding to requests.

Figure 3:
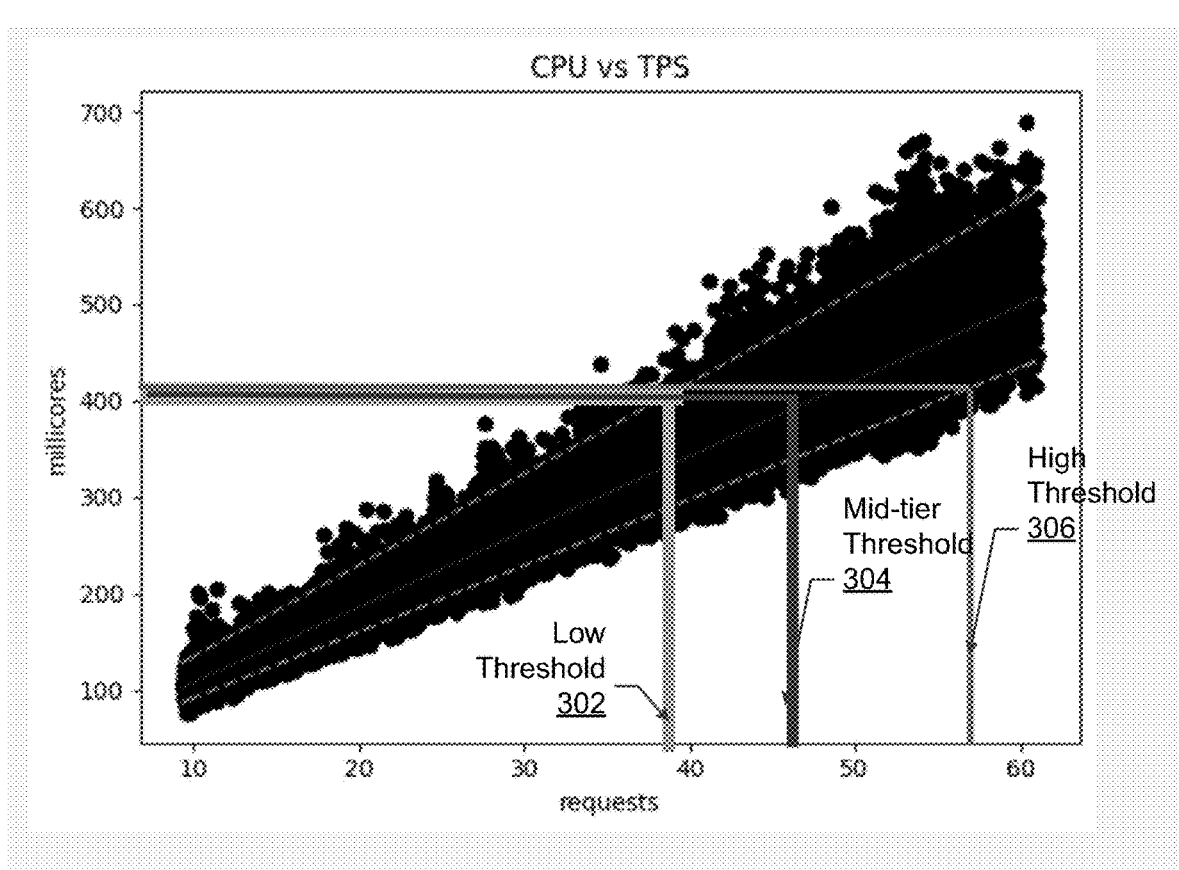
FIG. 3 shows an example, in accordance with one or more embodiments.

The following example is for explanatory purposes only and not intended to limit the scope of the invention. FIG. 3 shows an example graph (300) in accordance with one or more embodiments. Service instance data points are gathered over a time window of seven days. Each service instance data point includes a number of requests that the corresponding service instance processed and the CPU usage (i.e., as defined by millicores in the example) to process the number of requests. The black dots in FIG. 3 are individual service instance data points. The black dots span the service instances of the particular service.

Regression is performed to determine multiple correlation functions. For example, a low correlation function, a middle correlation function, and a high correlation function may be defined. From the various tiers of correlation functions a corresponding RPS threshold may be defined. The low correlation function may be used to generate a low threshold (302) that is a more active management of the service. For example, the mid-tier threshold (304) corresponds to a middle correlation function. A high tier threshold (306) corresponds to a less active management of the resources. For example, the middle correlation function may cause scaling of the service later, while the high correlation function may cause the even later scaling of the service.

For example, if eight hundred millicores are allocated to the service, and the scaling is to be performed when fifty percent of the millicores are in use, then the scaling would be performed at thirty-eight RPS for the low threshold, forty-seven RPS for the mid threshold, and fifty-eight RPS for the high threshold. Thus, the low threshold is thirty-eight, the mid threshold is forty-seven, and the high threshold is fifty-eight depending on the corresponding correlation threshold.

As another example, if six hundred millicores are allocated to the service, and the scaling is to be performed when five hundred millicores are in use, then the respective thresholds may be set to fifty for low threshold, fifty-nine for middle threshold, and seventy (approximately, but off the graph (300)) for high threshold. By using RPS as compared to CPU, the service manager may more easily determine how to manage the service.

The following is another example of an overall process in accordance with one or more embodiments. For the purposes of the example, consider the scenario in which service instances execute in containers that also execute a monitoring service. The container resource metrics include a container level CPU usage metric and a container level memory request metric.

First, RPS, CPU usage metrics, and data filtering metrics are queried per minute to obtain container level data points within a seven-day period. The querying results in service instance data points for each container for each minute over the course of the previous seven days.

Second, the service instance data points are aligned with "timestamp+container_name" as the primary key. Further, the metrics are ordered by timestamp. The following is an example set of service instance data points aligned accordingly. In the example, the order of fields is primary key, timestamp, container, RPS, CPU usage metric, ready status, request error, latency.

2024-02-25 18:50:00 test-pod-001, 2024-02-25 18:50:00, 100, 2300, 1, 0, 0.02
 2024-02-25 18:51:00 test-pod-001, 2024-02-25 18:51:00, 98, 2100, 1, 1, 0.2
 2024-02-25 18:52:00 test-pod-001, 2024-02-25 18:52:00, 95, 1900, 1, 0, 0.03
 2024-02-25 18:53:00 test-pod-001, 2024-02-25 18:53:00, 96, 1800, 1, 1, 0.02
 2024-02-25 18:54:00 test-pod-001, 2024-02-25 18:54:00, 99, 2300, 1, 0, 0.05
 2024-02-25 18:55:00 test-pod-001, 2024-02-25 18:55:00, 120, 2500, 1, 5, 1
 2024-02-25 18:55:00 test-pod-002, 2024-02-25 18:55:00, 0, 3000, 0, 0, 0.01
 2024-02-25 18:56:00 test-pod-001, 2024-02-25 18:56:00, 99, 2300, 1, 0, 0.03
 2024-02-25 18:56:00 test-pod-002, 2024-02-25 18:56:00, 18, 2500, 1, 0, 0.02
 2024-02-25 18:57:00 test-pod-001, 2024-02-25 18:57:00, 99, 2300, 1, 0, 0.03
 2024-02-25 18:57:00 test-pod-002, 2024-02-25 18:57:00, 28, 1900, 1, 0, 0.02
 2024-02-25 18:58:00 test-pod-001, 2024-02-25 18:58:00, 98, 2300, 1, 0, 0.03
 2024-02-25 18:58:00 test-pod-002, 2024-02-25 18:58:00, 38, 2200, 1, 0, 0.02
 2024-02-25 18:59:00 test-pod-001, 2024-02-25 18:59:00, 97, 2299, 1, 0, 0.03
 2024-02-25 18:59:00 test-pod-002, 2024-02-25 18:59:00, 58, 2200, 1, 0, 0.02
 2024-02-25 19:00:00 test-pod-001, 2024-02-25 19:00:00, 97, 2299, 1, 0, 0.03
 2024-02-25 19:00:00 test-pod-002, 2024-02-25 19:00:00, 67, 2100, 1, 0, 0.02
 2024-02-25 19:01:00 test-pod-001, 2024-02-25 19:01:00, 97, 2299, 1, 0, 0.03
 2024-02-25 19:01:00 test-pod-002, 2024-02-25 19:01:00, 90, 2500, 1, 0, 0.02

Third, the container that has ready status equal to "0" meaning unready have at least some of the service instance data points removed. Additional service instance data points for five minutes may further be removed. The container in the first couple of minutes may be in the warmup stage, since the first couple of minutes may have requests suffering slowness.

In the above sample data, the "ready status" of "test-pod-002" turns from "0" to "1" at 18:56. The data point "2024-02-25 18:55:00 test-pod-002, 2024-02-25 18:55:00, 0, 3000, 0, 0, 0.01" are filtered out. Also, the five minutes are filtered out because "18:56" should be filtered out and a predetermination is made that five minutes is the warmup time.

The following are the five data points to filter out of the set.

2024-02-25 18:56:00 test-pod-002, 2024-02-25 18:56:00, 18, 2500, 1, 0, 0.02
 2024-02-25 18:57:00 test-pod-002, 2024-02-25 18:57:00, 28, 1900, 1, 0, 0.02
 2024-02-25 18:58:00 test-pod-002, 2024-02-25 18:58:00, 38, 2200, 1, 0, 0.02
 2024-02-25 18:59:00 test-pod-002, 2024-02-25 18:59:00, 58, 2200, 1, 0, 0.02
 2024-02-25 19:00:00 test-pod-002, 2024-02-25 19:00:00, 67, 2100, 1, 0, 0.02

These "5 minutes" are used as an example, the average service warm up time of the service may be used in another embodiment.

After the above operation, the following is the remaining service instance data points. The fields are ordered again as primary key, timestamp, container, RPS, CPU usage metric, ready status, request error, and latency.

2024-02-25 18:50:00 test-pod-001, 2024-02-25 18:50:00, 100, 2300, 1, 0, 0.02
 2024-02-25 18:51:00 test-pod-001, 2024-02-25 18:51:00, 98, 2100, 1, 1, 0.2
 2024-02-25 18:52:00 test-pod-001, 2024-02-25 18:52:00, 95, 1900, 1, 0, 0.03
 2024-02-25 18:53:00 test-pod-001, 2024-02-25 18:53:00, 96, 1800, 1, 1, 0.02
 2024-02-25 18:54:00 test-pod-001, 2024-02-25 18:54:00, 99, 2300, 1, 0, 0.05
 2024-02-25 18:55:00 test-pod-001, 2024-02-25 18:55:00, 120, 2500, 1, 5, 1
 2024-02-25 18:56:00 test-pod-001, 2024-02-25 18:56:00, 99, 2300, 1, 2, 0.03
 2024-02-25 18:57:00 test-pod-001, 2024-02-25 18:57:00, 99, 2300, 1, 0, 0.03
 2024-02-25 18:58:00 test-pod-001, 2024-02-25 18:58:00, 98, 2300, 1, 0, 0.03
 2024-02-25 18:59:00 test-pod-001, 2024-02-25 18:59:00, 97, 2299, 1, 1, 0.03
 2024-02-25 19:00:00 test-pod-001, 2024-02-25 19:00:00, 97, 2299, 1, 0, 0.03
 2024-02-25 19:01:00 test-pod-001, 2024-02-25 19:01:00, 97, 2299, 1, 0, 0.03
 2024-02-25 19:01:00 test-pod-002, 2024-02-25 19:01:00, 90, 2500, 1, 0, 0.02

Further, an upper bound request error based on all containers' service instance data points. In the example, the upper bound is calculated as the top eighty percentile. To calculate the upper bound, the request error 0, 1, 0, 1, 5, 2, 0, 0, 1, 0, 0, 0 is sorted to 0, 0, 0, 0, 0, 0, 0, 1, 1, 1, 2, 5. The top 80 percentile is 1, so the upper bound is 1.

Further, the upper bound request latency is calculated on all containers' service instance data points. The top eighty percentile is used in the example. The latencies in the above example data points are 0.02, 0.2, 0.03, 0.02, 0.05, 1, 0.03, 0.03, 0.03, 0.03, 0.03, 0.03, 0.02, which is sorted to 0.02, 0.02, 0.02, 0.03, 0.03, 0.03, 0.03, 0.03, 0.03, 0.03, 0.05, 0.2, 1. Thus, the top 80 percentile of the latency is 0.03.

The data set is then filtered to remove service instance data points where the request error is greater than the upper bound request error. Thus, the revised data set is:

2024-02-25 18:50:00 test-pod-001, 2024-02-25 18:50:00, 100, 2300, 1, 0, 0.02

2024-02-25 18:51:00 test-pod-001, 2024-02-25 18:51:00, 98, 2100, 1, 1, 0.2

2024-02-25 18:52:00 test-pod-001, 2024-02-25 18:52:00, 95, 1900, 1, 0, 0.03

2024-02-25 18:53:00 test-pod-001, 2024-02-25 18:53:00, 96, 1800, 1, 1, 0.02

2024-02-25 18:54:00 test-pod-001, 2024-02-25 18:54:00, 99, 2300, 1, 0, 0.05

2024-02-25 18:57:00 test-pod-001, 2024-02-25 18:57:00, 99, 2300, 1, 0, 0.03

2024-02-25 18:58:00 test-pod-001, 2024-02-25 18:58:00, 98, 2300, 1, 0, 0.03

2024-02-25 18:59:00 test-pod-001, 2024-02-25 18:59:00, 97, 2299, 1, 1, 0.03

2024-02-25 19:00:00 test-pod-001, 2024-02-25 19:00:00, 97, 2299, 1, 0, 0.03

2024-02-25 19:01:00 test-pod-001, 2024-02-25 19:01:00, 97, 2299, 1, 0, 0.03

2024-02-25 19:01:00 test-pod-002, 2024-02-25 19:01:00, 90, 2500, 1, 0, 0.02

Further, the service instance data points having more then the upper bound request latency is filtered out to create the following revised data set:

2024-02-25 18:50:00 test-pod-001, 2024-02-25 18:50:00, 100, 2300, 1, 0, 0.02

2024-02-25 18:51:00 test-pod-001, 2024-02-25 18:51:00, 98, 2100, 1, 1, 0.2

2024-02-25 18:52:00 test-pod-001, 2024-02-25 18:52:00, 95, 1900, 1, 0, 0.03

2024-02-25 18:57:00 test-pod-001, 2024-02-25 18:57:00, 99, 2300, 1, 0, 0.03

2024-02-25 18:58:00 test-pod-001, 2024-02-25 18:58:00, 98, 2300, 1, 0, 0.03

2024-02-25 18:59:00 test-pod-001, 2024-02-25 18:59:00, 97, 2299, 1, 1, 0.03

2024-02-25 19:00:00 test-pod-001, 2024-02-25 19:00:00, 97, 2299, 1, 0, 0.03

2024-02-25 19:01:00 test-pod-001, 2024-02-25 19:01:00, 97, 2299, 1, 0, 0.03

2024-02-25 19:01:00 test-pod-002, 2024-02-25 19:01:00, 90, 2500, 1, 0, 0.02

The rest of the data points are fitted in a cartesian coordinate system, using the CPU usage metric as Y-axis and RPS as X-axis. A quantile regression algorithm is used with the quantile being 0.95 to create an upper bound CPU usage, as the upper bound prediction model. The latest "pod level CPU request metric" is queried. The pod level CPU request metric may be two thousand mil cores, uses 80% as the benchmark for the RPS, which is 1600 mil cores.

Using the 1600 mils cores as the input for the upper bound prediction model, the predicted RPS for rate limiting on container level is used. A similar method may be performed for each resource usage metric and resource constraints. The rate limiting RPS may be calculated based on each resource usage metric. Then, the minimum RPS across the different resource usage metrics is used as the target rate limiting RPS per container. A similar method may be performed for each request type to treat each request type individually.

If 90% is used as the benchmark for the burst RPS, the technique presented herein may be used to calculate the burst rate limiting as well.

Figure 4A:
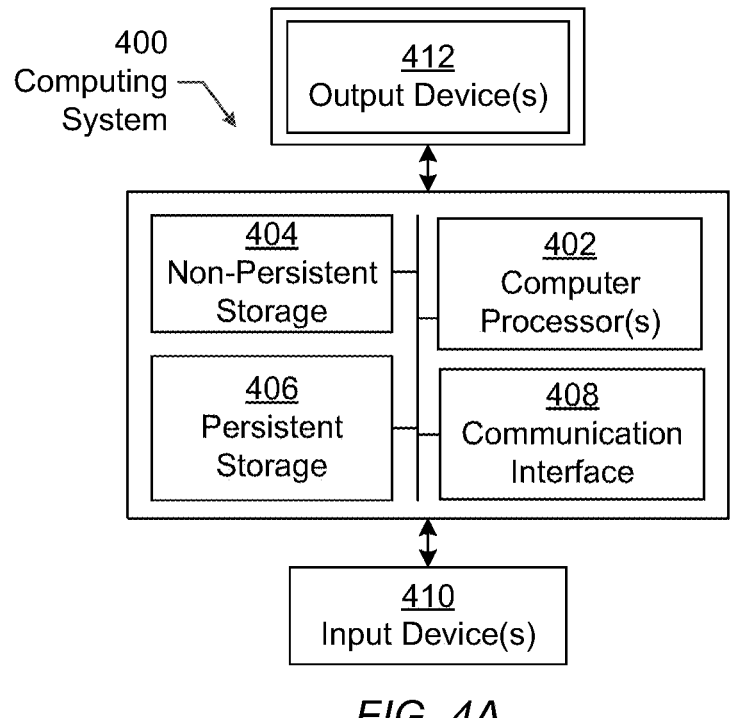
FIG. 4A and FIG. 4B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 4A, the computing system (400) may include one or more computer processors (402), non-persistent storage (404), persistent storage (406), a communication interface (408) (e.g., Bluetooth interface, infrared interface, network interface, optical interface, etc.), and numerous other elements and functionalities that implement the features and elements of the disclosure. The computer processor(s) (402) may be an integrated circuit for processing instructions. The computer processor(s) may be one or more cores or micro-cores of a processor. The computer processor(s) (402) includes one or more processors. The one or more processors may include a central processing unit (CPU), a graphics processing unit (GPU), a tensor processing units (TPU), combinations thereof, etc.

The input devices (410) may include a touchscreen, keyboard, mouse, microphone, touchpad, electronic pen, or any other type of input device. The input devices (410) may receive inputs from a user that are responsive to data and messages presented by the output devices (412). The inputs may include text input, audio input, video input, etc., which may be processed and transmitted by the computing system (400) in accordance with the disclosure. The communication interface (408) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the output devices (412) may include a display device, a printer, external storage, or any other output device. One or more of the output devices may be the same or different from the input device(s). The input and output device(s) may be locally or remotely connected to the computer processor(s) (402). Many types of computing systems exist, and the aforementioned input and output device(s) may take other forms. The output devices (412) may display data and messages that are transmitted and received by the computing system (400). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 4B:
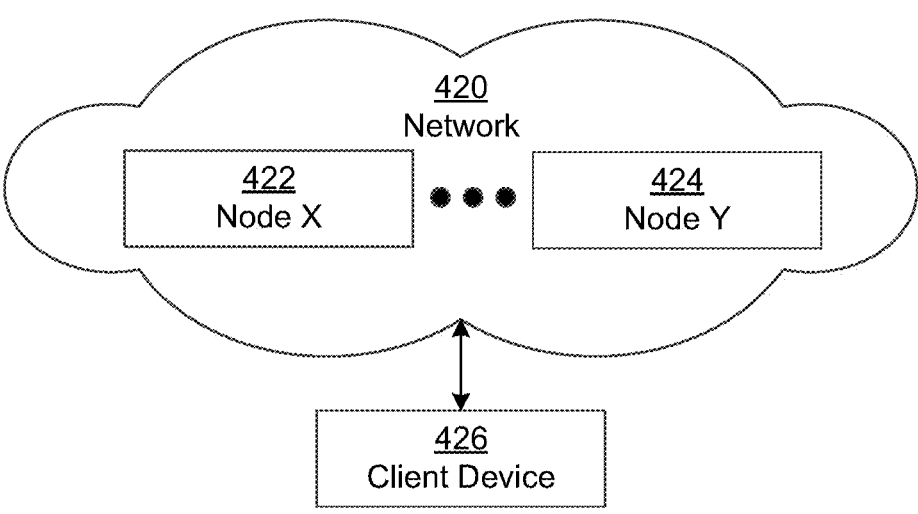

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

The nodes (e.g., node X (422), node Y (424)) in the network (420) may be configured to provide services for a client device (426), including receiving requests and transmitting responses to the client device (426). For example, the nodes may be part of a cloud computing system. The client device (426) may be a computing system, such as the computing system shown in FIG. 4A. Further, the client device (426) may include and/or perform all or a portion of one or more embodiments.

The computing system of FIG. 4A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
monitoring, over a first span of time and across a first plurality of service instances of a first service, a first resource usage of a hardware resource and a first requests per second (RPS) by the first plurality of service instances to obtain a first plurality of service instance data points comprising a first plurality of resource usage metrics related to a first plurality of RPS numbers;
performing a first regression of the first plurality of service instance data points to obtain a first current set of correlation functions between the first resource usage and the first RPS, wherein the first current set of correlation functions comprises a high correlation function, a mid-tier correlation function, and a low correlation function, and wherein the first RPS threshold determined from the high correlation function;
selecting a first RPS threshold according to the high correlation function and a first current amount of the hardware resource assigned to the first service;
selecting a second RPS threshold according to the mid-tier correlation function and the first current amount of the hardware resource assigned to the first service;
selecting a third RPS threshold according to the low correlation function and the first current amount of the hardware resource assigned to the first service;
continually monitoring the first RPS for the first service as a proxy for hardware resource usage to detect when the first RPS satisfies the first RPS threshold; and
changing executing of the first service responsive to the first RPS satisfying the first RPS threshold,
wherein the first RPS threshold, the second RPS threshold, and the third RPS threshold are used to performed independent management of the first service.

2. The method of claim 1, further comprising:
monitoring, over the first span of time and across a second plurality of service instances of a second service, a second resource usage of the hardware resource and second requests per second (RPS) by the second plurality of service instances to obtain a second plurality of service instance data points comprising a second plurality of resource usage metrics related to a second plurality of RPS numbers;
partitioning the first plurality of service instance data points from the second plurality of service instance data points based on service;
performing a corresponding regression and selecting a corresponding RPS threshold using the corresponding regression for the second service using the second plurality of service instance data points; and
managing the second service using the corresponding RPS threshold for the second service.

3. The method of claim 1, further comprising:
partitioning the first plurality of service instance data points according to a plurality of request types to obtain a plurality of partitions; and
performing a corresponding regression and selecting a corresponding RPS threshold using the corresponding regression for the plurality of partitions, wherein managing the first service comprises individually managing the plurality of request types using the corresponding RPS threshold.

4. The method of claim 1, further comprising:

filtering, from the first plurality of service instance data points, a plurality of outliers from the first plurality of service instance data points.

5. The method of claim 1, further comprising:

filtering, from the first plurality of service instance data points, a subset of the first plurality of service instance data points that correspond to a service instance, of the first plurality of service instances, having less than a threshold amount of operating time.

6. The method of claim 1, further comprising:

filtering, from the first plurality of service instance data points, a subset of the first plurality of service instance data points having more than a threshold latency, wherein the threshold latency is dynamically determined from the first plurality of service instance data points.

7. The method of claim 1, further comprising:

filtering, from the first plurality of service instance data points, a subset of the first plurality of service instance data points having more than a threshold amount of request errors, wherein the threshold amount of request errors is dynamically determined from the first plurality of service instance data points.

8. The method of claim 1, wherein managing the first service comprises:

instantiating at least one service instance of the first service responsive to the first RPS satisfying the first RPS threshold.

9. The method of claim 1, wherein managing the first service comprises:

performing request rate limiting of the first service responsive to the first RPS satisfying the first RPS threshold.

10. The method of claim 1, further comprising:

monitoring, over a second span of time and across the first plurality of service instances of the first service, a second resource usage of the hardware resource and second RPS by the first plurality of service instances to obtain a second plurality of service instance data points comprising a second plurality of resource usage metrics related to a second plurality of RPS numbers, wherein the second span of time is after the first span of time;

performing a second regression of the second plurality of service instance data points to obtain a second current set of correlation functions between the second resource usage and the second RPS;

selecting a fourth RPS threshold using the second current set of correlation functions and the first current amount of the hardware resource assigned to the first service; and replacing the first RPS threshold with the fourth RPS threshold to manage the first service using the fourth RPS threshold.

11. The method of claim 1, further comprising:

determining a second current amount of the hardware resource being assigned to the first service;

selecting a fourth RPS threshold using the first current set of correlation functions and the second current amount of the hardware resource assigned to the first service; and replacing the first RPS threshold with the fourth RPS threshold to manage the first service using the fourth RPS threshold.

12. A server computing device comprising:

a plurality of hardware resources;

a first plurality of service instances of a first service executing on the plurality of hardware resources;

a resource usage tracker executing on the server computing device and configured to perform first operations comprising:

obtaining, for over a first span of time and across the first plurality of service instances of the first service, a first resource usage of a hardware resource of the plurality of hardware resources and first requests per second (RPS) by the first plurality of service instances to obtain a first plurality of service instance data points comprising a first plurality of resource usage metrics related to a first plurality of RPS numbers;

performing a first regression of the first plurality of service instance data points to obtain a first current set of correlation functions between the first resource usage and the first RPS, wherein the first current set of correlation functions comprises a high correlation function, a mid-tier correlation function, and a low correlation function, and wherein the first RPS threshold determined from the high correlation function, and selecting a first RPS threshold according to the high correlation function and a first current amount of the hardware resource assigned to the first service, selecting a second RPS threshold according to the mid-tier correlation function and the first current amount of the hardware resource assigned to the first service;

selecting a third RPS threshold according to the low correlation function and the first current amount of the hardware resource assigned to the first service; and a service manager executing on the server computing device and configured to perform second operations comprising:

continually monitoring the first RPS for the first service as a proxy for hardware resource usage to detect when the first RPS satisfies the first RPS threshold, and changing executing of the first service responsive to the first RPS satisfying the first RPS threshold, wherein the first RPS threshold, the second RPS threshold, and the third RPS threshold are used to performed independent management of the first service.

13. The server computing device of claim 12, wherein the first operations further comprise:

monitoring, over the first span of time and across a second plurality of service instances of a second service, a second resource usage of a hardware resource and second requests per second (RPS) by the second plurality of service instances to obtain a second plurality of service instance data points comprising a second plurality of resource usage metrics related to a second plurality of RPS numbers, partitioning the first plurality of service instance data points from the second plurality of service instance data points based on service, performing a corresponding regression and selecting a corresponding RPS threshold using the corresponding regression for the second service using the second plurality of service instance data points, and managing the second service using the corresponding RPS threshold for the second service.

14. The server computing device of claim 12, wherein the first operations further comprise:

partitioning the first plurality of service instance data points according to a plurality of request types to obtain a plurality of partitions; and performing a corresponding regression and selecting a corresponding RPS threshold using the corresponding regression for the plurality of partitions, wherein managing the first service comprises individually managing the plurality of request types using the corresponding RPS threshold.

15. The server computing device of claim 12, wherein the first operations further comprise:

filtering, from the first plurality of service instance data points, a subset of the first plurality of service instance data points having more than a threshold latency, wherein the threshold latency is dynamically determined from the first plurality of service instance data points.

16. The server computing device of claim 12, wherein the first operations further comprise:

monitoring, over a second span of time and across the first plurality of service instances of the first service, a second resource usage of the hardware resource and second RPS by the first plurality of service instances to obtain a second plurality of service instance data points comprising a second plurality of resource usage metrics related to a second plurality of RPS numbers, wherein the second span of time is after the first span of time;

performing a second regression of the second plurality of service instance data points to obtain a second current set of correlation functions between the second resource usage and the second RPS;

selecting a fourth RPS threshold using the second current set of correlation functions and the first current amount of the hardware resource assigned to the first service; and replacing the first RPS threshold with the fourth RPS threshold to manage the first service using the fourth RPS threshold.

17. The server computing device of claim 12, wherein the first operations further comprise:

determining a second current amount of the hardware resource being assigned to the first service;

selecting a fourth RPS threshold using the first current set of correlation functions and the second current amount of the hardware resource assigned to the first service; and replacing the first RPS threshold with the fourth RPS threshold to manage the first service using the fourth RPS threshold.

18. A non-transitory computer readable medium comprising computer readable program code for causing a computing device to perform operations, the operations comprising:

monitoring, over a first span of time and across a first plurality of service instances of a first service, a first resource usage of a hardware resource and first requests per second (RPS) by the first plurality of service instances to obtain a first plurality of service instance data points comprising a first plurality of resource usage metrics related to a first plurality of RPS numbers;

performing a first regression of the first plurality of service instance data points to obtain a first current set of correlation functions between the first resource usage and the first RPS, wherein the first current set of correlation functions comprises a high correlation function, a mid-tier correlation function, and a low correlation function, and wherein the first RPS threshold determined from the high correlation function;

selecting a first RPS threshold according to the high correlation function and a first current amount of the hardware resource assigned to the first service;

selecting a second RPS threshold according to the mid-tier correlation function and the first current amount of the hardware resource assigned to the first service;

selecting a third RPS threshold according to the low correlation function and the first current amount of the hardware resource assigned to the first service;

continually monitoring the first RPS for the first service as a proxy for hardware resource usage to detect when the first RPS satisfies the first RPS threshold; and changing executing of the first service responsive to the first RPS satisfying the first RPS threshold, wherein the first RPS threshold, the second RPS threshold, and the third RPS threshold are used to performed independent management of the first service.

* * * * *